Inventors
Jean P. Manion
Daniel J. Davies
By Forest C. Sexton
Attorney

United States Patent Office 3,516,921
Patented June 23, 1970

3,516,921
APPARATUS FOR MAGNETIC STIRRING
OF DISCHARGE PLASMA IN CHEMICAL
SYNTHESIS
Jean P. Manion and Daniel J. Davies, Milwaukee, Wis., assignors to Allis-Chalmers Manufacturing Company, Milwaukee, Wis.
Filed Mar. 26, 1968, Ser. No. 716,192
Int. Cl. H05h 1/02
U.S. Cl. 204—311       3 Claims

ABSTRACT OF THE DISCLOSURE

A process and apparatus for chemical synthesis in the gas phase in conventional electrical glow discharge apparatus whereby the glow discharge plasma, between the discharge electrodes, is subjected to a magnetic field oscillating at a frequency of at least one-half cycle per residence time of the gas between the electrodes.

BACKGROUND OF THE INVENTION

This invention relates to a glow discharge process and apparatus for chemical synthesis. More specifically, this invention relates to a magnetic stirring system to be used in combination with glow discharge apparatus for chemical synthesis in gases whereby yield and efficiency are greatly enhanced.

It is well known prior art that many gases can be synthesized from other gases by glow discharge or discharge plasma techniques. That is, when a compound gas at a reduced pressure is subjected to electrical excitation at voltages sufficient to effect a glow discharge or plasma the gas is often dissociated into two or more component gases. For example, hydrogen and hydrazine can be synthesized from ammonia by such a process. During discharge, ammonia molecules are dissociated into hydrogen atoms and amino radicals $NH_2$, as transient intermediates. Subsequently, the amino radicals combine with one another to form hydrazine, $N_2H_4$, and the hydrogen atoms combine with one another to form hydrogen gas, $H_2$. The lifetimes of these transient species are determined both by their concentration and by the chemical rectivity of their environment. In the case of the $NH_2$ radical, the lifetime is on the order of milliseconds in ammonia at ambient temperatures and reduced pressure.

In many instances, however, discharge techniques are not commercially practical because yield and efficiency are low. One source of low yield and efficiency can be due to the fact that the dissociated intermediates often tend to recombine to reform the starting gas. For example, in the synthesis of hydrazine from ammonia, the intermediate hydrogen atoms have a strong tendency to recombine with the amino radicals thus reforming ammonia. The greater the concentration of hydrogen atoms in the mixture, the greater will be the amount of ammonia reformed thereby reducing the yield.

The above problem has been partially solved by various techniques whereby the recombining atom or ion is inactivated. In the synthesis of hydrazine, one method has been to catalyze the walls of the discharge tube with platinum or palladium to enhance the formation of hydrogen gas, $H_2$, from the hydrogen atoms. The molecular hydrogen gas is inactive towards recombination with the amino radicals. However, since any surface will serve as such a catalyst, other prior art techniques have been to increase the surface area of the discharge tube between the discharge electrodes. The disadvantage of these methods is the requirement that the hydrogen atoms must still diffuse through the gas containing amino radicals before $H_2$ formation can occur. Thus, large ammonia flow rates must be used to carry the H atoms to the walls in times which are short compared to their normal lifetimes. The large ammonia flow rates thus required result in decreased product concentration. In an alternate process, small quantities of chemicals capable of reacting rapidly with the hydrogen atoms have been added to the ammonia stream before entering the discharge. Cost of the additives used in one disadvantage of this process, and of course, hydrogen gas cannot be recovered.

In the synthesis of many gases such as hydrazine, the art has demonstrated that the rate of production cannot be efficiently increased by a simple increase in the discharge current. In fact, the art teaches that the converse is true, i.e., an increase in discharge current has the effect of decreasing the production rate per unit of current and results in a large decrease in energy yield. This is because the increased current causes an increase in initial dissociation, as for example, an increase in the formation of hydrogen atoms and amino radicals. Thus, the hydrogen atom concentration in the reacting ammonia is increased. This serves to increase the reformation of ammonia as the incoming gas is dissociated.

SUMMARY OF THE INVENTION

In accordance with the present invention, greatly improved yields and efficiencies can be realized in discharge gas synthesis by imposing a magnetic field, of proper strength and oscillating or rotating at proper frequencies, on the discharge plasma struck in the moving gas stream. The stirring action of the magnetic field serves to deflect the electrically charged plasma into fresh unreacted gas, resulting in lower concentrations of the intermediate products in each new volume of unreacted gas treated per unit of time with no decrease in current intensity. In the synthesis of hydrazine, therefore, the stirring action reduces the instantaneous hydrogen atom concentration in each volume of ammonia treated per unit of time. Hence the stirring action by oscillating or rotating the discharge plasma at a proper frequency, reduces the rate of reformation of the starting gas. Because the stirring action has the effect of reducing the local hydrogen atom concentration in the glow discharge; a moderate increase in discharge current over prior art limits, can in fact be tolerated and will further increase the rate of production at no decrease in energy yield.

Accordingly the primary object of this invention is to provide a new and improved method and apparatus for chemical synthesis by discharge techniques whereby the discharge plasma is subjected to an oscillating or rotating magnetic field of sufficient strength and frequency as will effectively stir the plasma to reduce the tendencies towards reformation of the starting material.

Another primary object of this invention is to provide a method and apparatus for chemical synthesis by discharge techniques whereby the rate of production is increased at present optimum discharge currents with attendant increases in product energy yield.

A further primary object of this invention is to provide a method and apparatus for hydrazine synthesis by discharge techniques whereby the ratio of hydrazine product to ammonia reactant passed is increased thereby increasing the hydrazine concentration and rendering product separation easier and more economical.

A still further primary object of this invention is to provide a method and apparatus for hydrazine synthesis by discharge techniques permitting an increase in discharge current over present optimized currents, leading to further increases in product rate per discharge plasma with no decrease in present energy yield.

DESCRIPTION OF THE PREFERRED EMBODIMENTS

Figure 1:
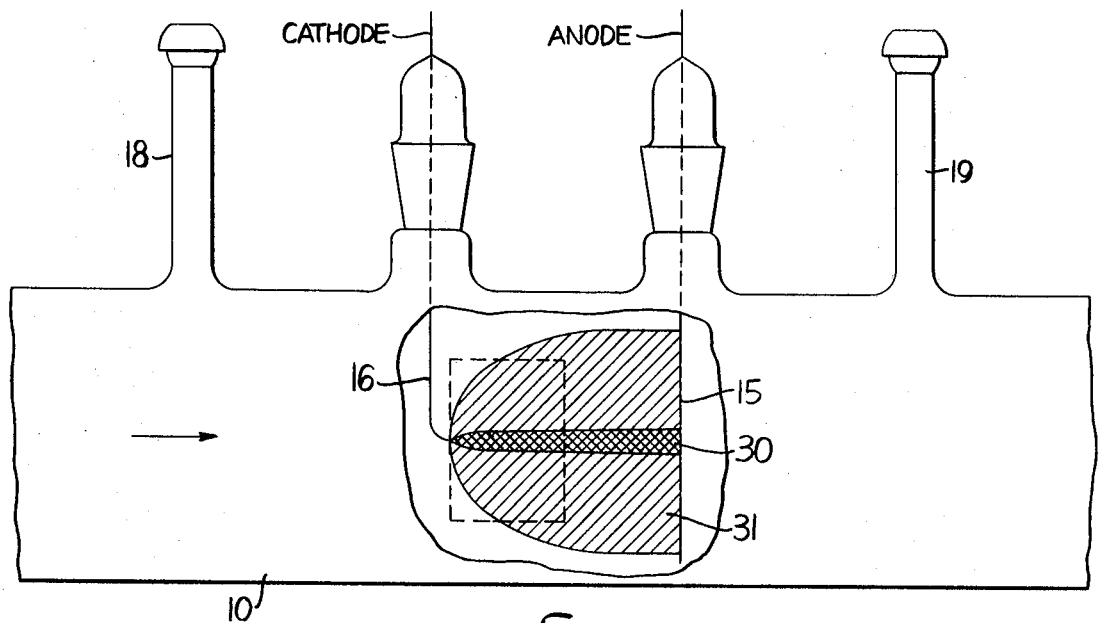
FIG. 1 is a sectional side view of a discharge tube. The heavily shaded portion shows the size and shape of the unstirred discharge plasma. The lightly shaded area shows the size and shape of the stirred discharge plasma as it appears in operation.

Although it is readily apparent that the process and apparatus of this invention would be equally beneficial in the synthesis of any gas by glow discharge techniques in which similar reaction kinetics are involved as, for example, the direct discharge synthetis of hydrogen peroxide from water vapor, in the interest of brevity, the following discussion will be concerned primarily with the glow discharge synthesis of hydrazine from ammonia.

Referring to the drawings, the glow discharge apparatus of the present invention comprises an elongated tube 10 of an electrically nonconductive material such as glass, Vycor, quartz, or other suitable insulating material such as ceramic. The tube 10 is open at both ends to provide inlet and outlet ports (not shown). A pair of discharge electrodes, namely, anode 15 and cathode 16, extend radially into the tube 10. The electrodes are provided with suitable connections to a source of DC or AC potential (not shown). If desired, a pair of access ports 18 and 19 may be provided for pressure measurements.

Any suitable conductor such as tantalum, tungsten, copper, silver, iron, platinum or the like may be used as an electrode material. Tungsten has been found to be particularly effective as an electrode material. It is preferred, however, that the cathode used in the discharge apparatus be a low work function electrode. A low work function electrode within the meaning of this invention is any electrode having a photoelectric work function of about 2.5 electron volts or less. One way to effect a low work function electrode is to coat the surface thereof with an alkaline earth metal, alkali metal or oxides thereof. For example, lithium, sodium, potassium, rubidium, cesium, zirconium oxide, cesium oxide, strontium oxide are illustrative materials of which the surface of the low work function cathode may be comprised.

The crux of the invention is the alternating current electromagnet 20 (FIG. 2), which consists of a toroidal ferro-magnetic core having a gap cut therethrough to form pole pieces. The core is wound with a wire 22, the terminals of which are connected to a source of alternating current (not shown). The wound wire 22, is covered with a suitable insulation such as vinyl plastic. Since electromagnets of this type are well known in many arts, further detailed discussion thereof is not necessary here. It should be sufficient to say that the parameters of the electromagnet, such as core material, number of windings, power supplied, etc., should be chosen and combined so that the electromagnet will be capable of maintaining a magnetic field of the required strength across the gap.

Figures 2, 3:
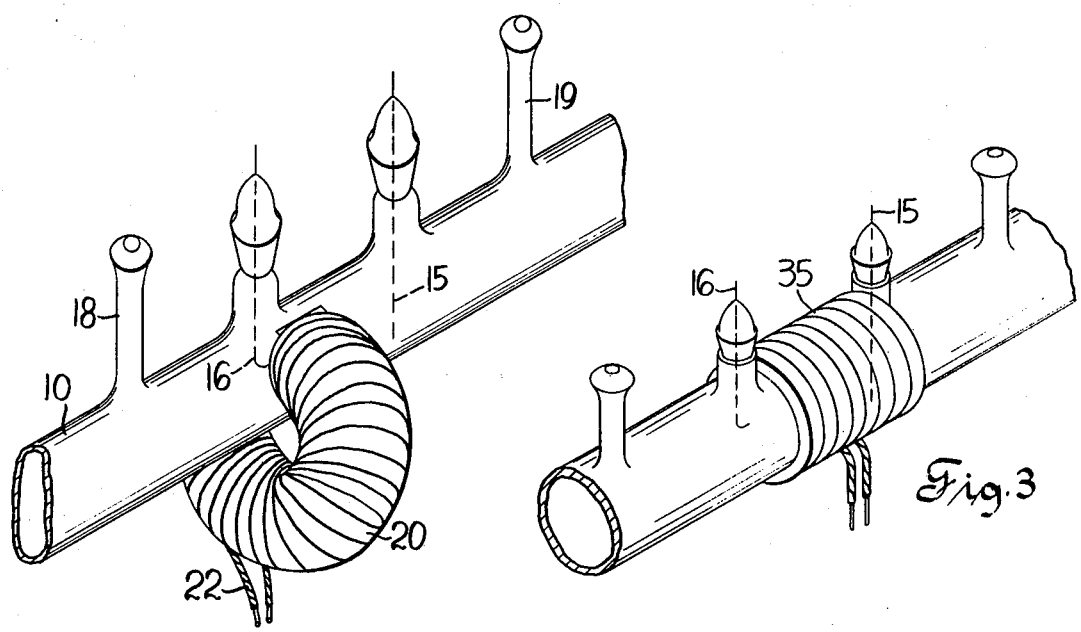
FIG. 2 is a perspective view of a discharge cell having a toroidal magnet for oscillating or stirring the plasma in two dimensions.
FIG. 3 is a perspective view of a discharge cell having a stator like winding to impose a rotating magnetic field for stirring the plasma in three dimensions.

It is, of course, desirable that the gap in the toroidal magnet 20 be minimized so as to minimize flux losses. For this reason, it is preferable that a partially flattened discharge tube 10 be used as shown in FIG. 2. The partially flattened tube 10 will not only permit a narrower gap in the magnet, but for the case of two dimensional stirring being illustrated here, it will minimize the cross sectional area of unstirred gas.

In operation, the gas to be dissociated is passed through the tube 10 while the electrodes 15 and 16 are subjected to an electrical potential. In the synthesis of hydrazine from ammonia, it is desirable that the pressure of the ammonia in the glow discharge area be within a range of from 5 to 150 millimeters of mercury. At pressures much above 150 millimeters of mercury, energy yield usually decreases rapidly. To further achieve optimum results, it is preferred that the interelectrode distance be within a range of from 0.6 to 6.0 centimeters. The selection of the actual interelectrode distance within this range is dependent upon the ammonia pressure used. That is, to achieve optimum yields of hydrazine, the choice of interelectrode distance is found to be inversely proportional to the ammonia pressure.

The ammonia gas may be passed through the area of glow discharge at any rate. However, the prior art has shown that the linear rate is preferably within the range of 9,000 to 30,000 centimeters per second.

In prior art low temperature processes, the amount of current employed to produce hydrazine from ammonia was preferably within a range of from 10 to 80 milliamperes, and possibly as high as 100 milliamperes. It is known that in prior art low temperature apparatus, discharge currents substantially above 80 milliamperes, energy yield is disadvantageously affected. As explained above, this is because the hydrogen atom concentration in the discharge area is so great that re-formation of ammonia is favored over the formation of hydrazine. In this invention, however, the magnetic stirring action causes a decrease in hydrogen atom concentration within the glow discharge or plasma, and hence, higher currents can be utilized beneficially. In the practice of this invention, therefore, the current may vary from 10 to 200 milliamperes, with a current of about 160 milliamperes being most ideal. It is well known in the art that the voltage is dependent upon pressure, current, gap, flow rate and the other process parameters. Therefore, persons skilled in the art will readily be able to determine the necessary voltage when all other parameters are known.

The magnetic field requirements produced by the electromagnet 20 are dependent upon parameters such as cell diameter, gas flow velocity, gas pressure and electrode gap distance. Generally stated, the optimum field strength is that which stirs the maximum cross sectional area of flowing gas per single pass of the gas without deflecting the reaction plasma into the slow moving gas adjacent to the discharge cell walls. For the process parameters we have worked with we have utilized magnetic fields of from 700 to 1400 gauss.

For the embodiment of FIGS. 1 and 2, that is, two dimensional stirring with oscillation in a single plane, the oscillation frequency of the magnetic field is preferably on the order of one-half cycle per residence time of the gas between electrodes. In this way, the oscillating discharge arc will be continually oscillating or moving into a fresh volume of unreacted gas as this fresh volume of gas replaces the previously reacted gas. If the frequency of the magnetic field is substantially higher than the preferred frequency given above, then a given volume of gas will be subjected to the discharge more than once during its residency between electrodes. This can cause a decrease in rate of hydrazine production due to localized increased hydrogen atom production as well as possible direct hydrazine decomposition by the discharge. As noted previously, an excessive hydrogen atom concentration will promote re-formation of ammonia in opposition to the formation of hydrazine. Similarly, if the oscillation frequency of the magnetic field is substantially lower than the preferred frequency noted above, the production rate is reduced for the essentially same reason, accumulation of hydrogen atoms and increase of the ammonia-forming back reaction ($NH_2+H \rightarrow NH_3$). That is to say, the discharge arc is oscillating so slowly that it does not move or oscillate into all portions of a given volume of gas during its residence between electrodes. Those portions which are subjected to the discharge, are so subjected over a more prolonged period of time than is necessary which causes an excessive hydrogen atom concentration and accordingly a further decreased production rate.

FIG. 1 contrasts the effect of the magnetic stirring action of this invention with the prior art. The shaded areas between the electrodes 15 and 16 show the shape of the plasma or glow discharge arc with and without magnetic stirring. The heavily shaded area 30 represents the typical shape and configuration of the plasma when hydrazine is synthesized from ammonia in accordance with prior art techniques without magnetic stirring. The plasma is usually centered at the axis of the tube 10 and has a relatively small cross sectional area. It is apparent that a substantial quantity of gas (ammonia) will pass through the tube 10 without being subjected to the glow discharge. This, of course, is one reason for the relatively low concentration, as well as low yield based on energy input. The lightly shaded area 31 represents the configuration of the plasma with magnetic stirring. This is actually an integrated time configuration over one complete cycle. That is to say, with magnetic stirring, the cross sectional area of the plasma at any instant is approximately equal to the cross sectional area without magnetic stirring, but the stirring action causes the plasma, such as that represented by area 30, to oscillate up and down so that a greater volume, as represented by area 31 is covered during one complete cycle. Therefore, if the frequency of the oscillating magnetic field is approximately equal to one-half cycle per residence time of the gas between electrodes, then any given volume of gas between the electrodes will eventually be subjected to the glow discharge as represented by area 31. Since the plasma or discharge is continuously moving into unreacted gas, the hydrogen atom concentration at any one point or area is lower.

Another embodiment of this invention includes a magnetic system that would stir the plasma in three dimensions causing the plasma to rotate within the tube 10. This could easily be effected by providing a conventional cylindrical tube 10 and positioning the poles of another toroidal magnet transverse to the poles of the first toroidal magnet 20. Hence, the plasma is surrounded by four pole faces for two pairs of parallel faces, one pair perpendicular to the other. By properly synchronizing the two magnets, the plasma could be made to rotate within the tube 10.

We have found, however, that the simplest way of effecting a rotational motion of the plasma is to utilize an annular statorlike winding 35 as shown in FIG. 3. This statorlike winding is substantially the same as the stator in an ordinary polyphase alternating current motor, particularly polyphase induction motors. Such stators usually comprise a field core of laminated iron with slots spaced uniformly around the inner periphery. The slots are usually semi-enclosed with form wound wire coils inserted therein. A single coil will span several slots to form a complete pole pitch. For example, in a 24 slot field core, a 4 pole winding may be made from single coils each spanning 6 slots. Thus the first coil would span from slot 1 to slot 6 and the next coil would span from slot 2 to slot 7 and be connected in series with the first coil, and so on with 4 more coils to complete one pole of the 4 pole winding. Such stators are well known and are known to produce a rotating magnetic field. Further details thereof are therefore not necessary here. It should be sufficient to say that the number of poles, winding, etc. should be such as to create the desired rotation frequency.

The optimum frequency determined for two dimensional stirring was stated to be one-half cycle per residence time of the gas between electrodes. This is a characteristic of the two dimensional stirring technique used which results in each affected region of the cell being treated once during one cycle of the magnet.

In the case of three dimensional rotary stirring the deflected plasma traces an ellipsoidal form completing one total revolution per magnetic cycle thus affecting no portion of the cell volume more than once per cycle. Therefore, with rotary stirring, the enhancement of production rate and energy yield are significantly greater than observed in the planar examples actually tested. The reason for this is the fact that under the optimum conditions found for planar stirring approximately 50 percent of the gas passing through the cell is not exposed to the discharge while another significant portion of the gas stream is subjected to the discharge twice. It is noted, of course, that without even two dimensional stirring one volume of the gas would be exposed to the discharge continuously during the entire residence time.

For the case of rotary stirring, the treated gas would have ample recovery time during the magnetic cycle to allow more than one magnetic cycle to be used during the residence time of the gas between electrodes and thus even greater enhancements of production rate and energy yield. Hence, the optimum frequency for rotary stirring is a less well defined range of frequencies upward from residence time equals one cycle and perhaps at about two cycles per residence time.

The following examples are presented to more particularly illustrate the principles of this invention. These examples, however, are only illustrative and should not be considered as limitations of the invention.

Example I

In apparatus substantially as shown in FIG. 2, hydrazine was synthesized from ammonia by passing ammonia gas, at an absolute pressure of 2.5 millimeters of mercury, through the tube 10A at a flow rate of 0.142 gram per second. This flow rate corresponds to a linear gas velocity of 16,000 centimeters per second. The cathode electrode, having a low work function material on its surface, was upstream 4 centimeters from the anode electrode consisting of a tungsten wire. An electrical potential of 228 volts was required to maintain a discharge current of 160 milliamperes across the electrodes. The powdered iron core of the toroidal magnet 20 was wound with #16 gauge stranded wire insulated with 10 mil vinyl plastic. It is estimated that when peak magnetic fields of 1,100 gauss were achieved, 14 turns of stranded wire per centimeter of core length were used. The magnet was operated in a series-resonant electrical circuit driven by an audio-frequency signal generator and a 200 watt McIntosh power amplifier. Discrete variations in magnetic frequency were achieved by changing the capacitive element of the resonant circuit. Measurements of magnetic current, voltage and magnetic flux density were made using an oscilloscope and a vacuum tube voltmeter. Under these conditions and a magnetic oscillating frequency of 2.06 kilocycles (residence time equal to ½ cycle), hydrazine was produced at a rate of 4.90 moles per second at an energy yield of 15.5 grams per kilowatt-hour.

Examples II–VII

Six more experiments were conducted substantially as detailed above, but the magnet frequency was varied. Table I below contrasts the results of these examples, including Example I detailed above.

TABLE I

Electrode gap—4 cm.
NH₃ pressure—2.5 mm. Hg.
Discharge current—160 mamp.
Flow velocity—16,000 cm./sec.
Magnetic field—Varying sinusoidally with a maximum value of 1,140 gauss and peak to peak value of 2,280 gauss.

| Example | Voltage | NH₃ flow (g./sec.) | Production rate | Energy yield | Frequency (kc.) | Magnet cycles during residence time |
|---|---|---|---|---|---|---|
| 1 | 228 | 0.142 | 4.90 | 15.5 | 2.06 | 0.5 |
| 2 | 242 | 0.136 | 4.37 | 13.0 | 1.4 | 0.35 |
| 3 | 223 | 0.144 | 4.35 | 14.0 | 2.9 | 0.73 |
| 4 | 220 | 0.145 | 4.15 | 13.5 | 4.1 | 1 |
| 5 | 217 | 0.136 | 3.66 | 12.0 | 4.1 | 1 |
| 6 | 213 | 0.141 | 3.77 | 11.4 | 5.4 | 1.35 |
| 7 | 202 | 0.134 | 3.35 | 10.6 | 8.2 | 2 |

Examples VIII–XII

By way of contrast, hydrazine was produced in the same apparatus and following substantially the same procedure except that magnetic stirring was not used. In order to maintain a current of 160 milliamperes, it was necessary that somewhat lower voltages be used. Table II below gives the results of these examples and the average result.

TABLE II

Electrode gap—4 cm.
$NH_3$ pressure—2.5 mm. Hg.
Discharge current—160 mamp.
Flow velocity—16,000 cm./sec.

| Example | Voltage | $NH_3$ flow (g./sec.) | Production rate | Energy yield |
|---|---|---|---|---|
| 8 | 175 | 0.142 | 2.58 | 10.61 |
| 9 | 176 | 0.142 | 2.74 | 11.20 |
| 10 | 175 | 0.138 | 2.32 | 9.54 |
| 11 | 176 | 0.137 | 2.81 | 11.50 |
| 12 | 177 | 0.132 | 2.60 | 10.60 |
| Average | 176 | 0.138 | 2.61 | 10.69 |

To contrast, it can be seen that the production rates in Examples I–VII were improved respectively 88 percent, 67 percent, 67 percent, 59 percent, 40 percent, 29 percent and 29 percent over the average production rate when magnetic stirring was not used. In Examples I–VII, energy yields were improved by 45 percent, 22 percent, 31 percent, 27 percent, 12 percent, 7 percent and down 1 percent, respectively.

It should be apparent that many modifications could be made in the magnetic stirring apparatus and process detailed herein without departing from the basic concept of this invention. Accordingly, this invention should not be limited to the details given herein but may be modified within the scope of the appending claims.

The embodiments of the invention in which an exclusive property or privilege is claimed are defined as follows:

1. In an apparatus for chemical synthesis in the gaseous state of the type comprising an elongated nonconductive tube open at both ends to provide inlet and outlet parts, means for subjecting said tube to a reduced pressure, a pair of discharge electrodes disposed within said tube, means for maintaining an electrical potential between said electrodes, means for passing a reactant gas through said tube, whereby said reactant gas is subjected to an electrical glow discharge as it passes between said electrodes converting it to a product gas, and means for subjecting the electrical discharge to a magnetic field; the improvement wherein the means for subjecting the electrical glow discharge to a magnetic field includes a toroidal ferromagnetic core having a gap cut therethrough to form pole pieces, said pole pieces disposed on opposite sides of said glow discharge and adapted to impose an alternating magnetic field oscillating at a frequency of at least one half cycle per residence time of the gas between the electrodes.

2. The apparatus for chemical synthesis as described in claim 1 further comprising a second toroidal ferromagnetic core having a gap cut therethrough to form pole pieces, said pole pieces disposed on opposite sides of said electrical glow discharge transverse to the pole pieces on the first toroidal ferromagnetic core.

3. The apparatus for chemical synthesis as described in claim 1 wherein said alternating current electromagnet comprises an annular statorlike winding as will effect a rotating magnetic field, said statorlike winding disposed concentrically around said elongated nonconductive tube between said electrodes.

References Cited

UNITED STATES PATENTS

| | | | |
|---|---|---|---|
| 3,049,488 | 8/1962 | Jackson et al. | 204—312 |
| 3,324,027 | 6/1967 | Berghaus | 204—311 |
| 3,376,211 | 4/1968 | Bjornson | 204—311 |
| 3,400,070 | 9/1968 | Naff | 204—311 |

ROBERT K. MIHALEK, Primary Examiner

U.S. Cl. X.R.

204—156, 177, 312